United States Patent [19]
Matsuura et al.

[11] Patent Number: 5,592,999
[45] Date of Patent: Jan. 14, 1997

[54] ACTUATED SHOCK ABSORBER LINK MECHANISM WITH VARIABLE LINK RATIO AND LINK FORM

[75] Inventors: Masaaki Matsuura; Toichiro Hikichi; Mitsuru Saito; Takuya Tagami, all of Saitama, Japan

[73] Assignee: Honda Giken Kogyo Kabushiki Kaisha, Tokyo, Japan

[21] Appl. No.: 474,485

[22] Filed: Jun. 7, 1995

[30] Foreign Application Priority Data

Sep. 13, 1994 [JP] Japan .................................. 6-244590

[51] Int. Cl.⁶ .................................................. B62K 25/26
[52] U.S. Cl. ........................................ 180/227; 280/284
[58] Field of Search .............................. 180/219, 227; 280/281.1, 284, 285, 275

[56] References Cited

FOREIGN PATENT DOCUMENTS 61-122089 6/1986 Japan .
6-8872 1/1994 Japan ..................................... 180/227

*Primary Examiner*—Kevin Hurley

[57] ABSTRACT

A shock absorber link mechanism linking a rear shock absorber to a swing arm of a motorcycle is capable of varying the suspension height and the height of a vehicle. The shock absorber link mechanism includes a first link arm pivotally attached to the frame, a second link arm pivotally attached to a swing arm, a shock absorber link arm pivotally attached to the shock absorber, and an arm connecting shaft. A motor driven actuator varies the link ratio (height) and link form (load characteristic) of the shock absorber link mechanism by rotating the shock absorber link arm via a motion transmission member, pulley, sectoral gear and arm connecting shaft. Further, a sub-wire driven by the actuator compresses the shock absorber when the suspension is lowered.

26 Claims, 15 Drawing Sheets

○ FULLY COMPRESSED
△ PASSENGER
□ NO PASSENGER
● UNCOMPRESSED

○ FULLY COMPRESSED
△ PASSENGER
□ NO PASSENGER
● UNCOMPRESSED

ACTUATED SHOCK ABSORBER LINK MECHANISM WITH VARIABLE LINK RATIO AND LINK FORM

BACKGROUND OF THE INVENTION

1. Field of the Invention

This invention relates to a rear wheel suspension apparatus for a motorcycle by which the height of the motorcycle can be adjusted.

2. Description of Background Art

A rear wheel suspension apparatus for a motorcycle is disclosed in Japanese Patent Laid-open No. Hei 5-16639 wherein an upper-end mounting portion of a rear shock absorber is driven by a motor to move in forward and backward directions to vary the mounting position of the rear shock absorber to adjust the height of the motorcycle.

Another rear wheel suspension apparatus for a motorcycle is disclosed in Japanese Patent Laid-open No. Sho 61-122089 wherein a connecting shaft between a first link arm on a body frame side and a second link arm on a rear swing arm side, which constitute a link of the rear wheel suspension apparatus, is coupled to a lower end portion of a rear shock absorber by way of an eccentric member wherein the connection point is manually adjusted to vary the link ratio and adjust the height of the motorcycle.

If an actuator is provided on an upper end portion side of a rear shock absorber as in Japanese Patent Laid-open No. Hei 5-16639, the actuator is always acted upon by a load from the rear wheel side, and as a result, the actuator must be relatively large and heavy to withstand this repeated stress. Because Japanese Patent Laid-open No. Sho 61-122089 involves manual adjustment, the operation is so complicated and cumbersome that it is impossible to rapidly adjust the height of the motorcycle while driving.

Depending upon the driver, however, it is sometimes desirable to adjust the height of the motorcycle while driving in order to make the height of the motorcycle suitable for the road on which the motorcycle is running. With the rear wheel suspension apparatus of Japanese Patent Laid-open No. Sho 61-122089 described above, however, it is impossible to perform height adjustment while the driver remains on the motorcycle. Also, a suspension structure that can maintain an ideal load characteristic even when the height of the motorcycle adjustment is demanded.

SUMMARY AND OBJECTS OF THE INVENTION

It is a principal object of the invention of the present application to solve the above mentioned problems and thereby satisfy the demands of the motorcycle driver.

In order to solve the subject described above, according to the present invention, there is provided a rear wheel suspension apparatus for a motorcycle which includes a rear swing arm mounted for pivotal motion on a rear wheel of the motorcycle and a shock absorber link mechanism for interconnecting the rear swing arm and the body frame. A rear shock absorber is connected at one end to the shock absorber link mechanism and connected at the other end to the body frame. The shock absorber link mechanism includes a first link arm mounted at one end for pivotal motion on the body frame side, a second link arm mounted at one end for pivotal motion on the first link arm and mounted at the other end for pivotal motion on the rear swing arm. The shock absorber link mechanism further includes shock absorber link arm mounted at one end for pivotal motion in the proximity of a connection portion between the first link arm and the second link arm and mounted at the other end for pivotal motion on the rear shock absorber. The shock absorber link arm is rockable around a pivotally mounted portion provided in the proximity side of the connection portion between the first link arm and the second link arm. The rear wheel suspension apparatus further includes a driving means for automatically rocking the shock absorber link arm.

Further, the rear wheel suspension apparatus for a motorcycle can be constructed such that the height adjustment driving means includes an actuator on the driving side, a motion transmission member and a driven portion on the driven side. The actuator is secured to the body frame side and the driven portion is mounted on the shock absorber link arm side while the actuator and the driven portion are interconnected by the motion transmission member.

As a concrete example of such a motion transmission member, there is a flexible member such as a wire which is taken up onto or fed out from a pulley. Further, the actuator may be constructed with a motor and a speed reduction gear mechanism and the driven portion may be constructed with a driven shaft and a mechanical member for transmitting rotation of the driven shaft to the shock absorber link arm.

Further, the rear wheel suspension apparatus which includes the rockable shock absorber link arm may be constructed such that it includes a stopper provided on the shock absorber link arm for contact with either the first link arm or the second link arm (depending upon the direction of rocking motion) to limit the rocking motion of the shock absorber link arm within a predetermined range.

The rear wheel suspension apparatus for a motorcycle which allows variation of the link form may be constructed such that a plurality of contacting points with the stopper are provided on either the first link arm side or the second link arm side to control the rocking motion of the shock absorber link arm to a plurality of stages.

Further, the rear wheel suspension apparatus for a motorcycle wherein the link form can be varied and the rocking motion of the shock absorber link arm can be controlled to a plurality of stages with a clearance adjustment mechanism. The invention may be constructed such that at least a driving portion of the driving means on the driven side is supported on one of the first link arm and the second link arm with which the shock absorber link arm is contacted in the form of a link form used normally.

When the shock absorber link arm is rocked by the driving means, the link ratio is rapidly varied, and as a result, the height of the motorcycle is adjusted. Thereupon, if the shock absorber link arm is varied in a direction in which the link ratio increases from a normal motorcycle height condition, the height of the motorcycle decreases rapidly. On the contrary, if the shock absorber link arm is varied in a direction in which the link ratio decreases from the condition wherein the height of the motorcycle is low, then the height of the vehicle increases to that in the normal motorcycle height condition.

Because adjustment of the height of the motorcycle is performed automatically in this manner, a driver can adjust the height while remaining on the motorcycle. In contrast, the conventional manual height adjustment necessitates the driver getting off the motorcycle. According to the present invention, the height of the motorcycle can be adjusted while the driver remains on the motorcycle.

Moreover, since a motorcycle height adjustment mechanism is formed by making use of the shock absorber link mechanism, the height adjustment driving means can be made comparatively small in size and low in weight. Further, if the actuator and the driven portion of the height adjustment driving means are separated from each other and are interconnected by the motion transmission member, the non-suspended load can be reduced by disposing the actuator separately on a spring. In this way, the actuator can be prevented from being driven by movement of the shock absorber link mechanism which is rocked together with the rear swing arm.

Further, a stopper for contacting with either the first link arm or the second link arm (depending upon the direction of the rocking motion) for limiting the rocking motion of the shock absorber link arm within a predetermined range is provided on the shock absorber link arm. The link form of the shock absorber link mechanism can be varied because either the first link arm and the shock absorber link arm stopper are in contact or the second link arm and the stopper are in contact with each other (depending upon the direction of the rocking motion) so that the shock absorber link arm is integrated with either the first link arm or the second link arm. Consequently, if the link form is varied to change over the load characteristic even in a condition wherein, for example, the height of the motorcycle is low, an ideal load characteristic can be obtained whether the height of the motorcycle is high or low.

Moreover, if the rear wheel suspension apparatus for a motorcycle which allows variation of the link form is constructed such that a plurality of contacting points with the stopper are provided on either the first link arm or the second link arm, since the rocking motion of the shock absorber link arm can be controlled to a plurality of rocking angles, the link ratio can be varied without varying the link form.

Further, if the rear wheel suspension apparatus wherein the rocking motion of the shock absorber link arm can be controlled to a plurality of stages is constructed such that at least a driving portion of the driving means on the driven side is supported on one of the first link arm and the second link arm with which the shock absorber link arm is contacted in the link form used normally, then when the link ratio is varied in the same link form, since the driven portion and the shock absorber link arm move integrally, even if the rear swing arm is rocked, no influence is had, and as a result, the driven portion is required to have a small amount of motion. Consequently, reduction in size can be achieved. Further, since the motion transmission member for the driving force need not have an excessively high strength, this can contribute to a reduction in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 2:
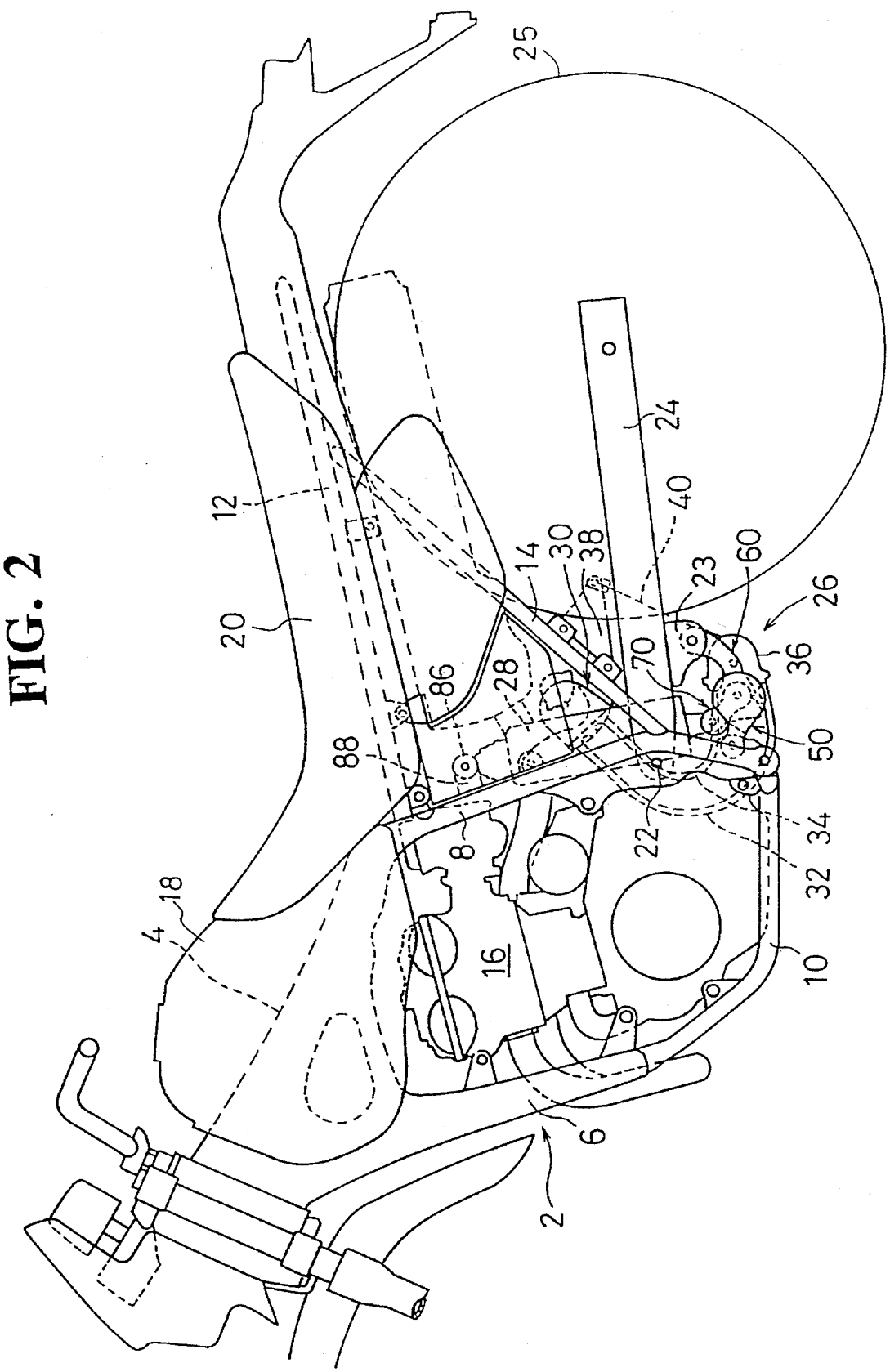
FIG. 2 is a side elevational view of a motorcycle to which the embodiment is applied.
Figure 3:
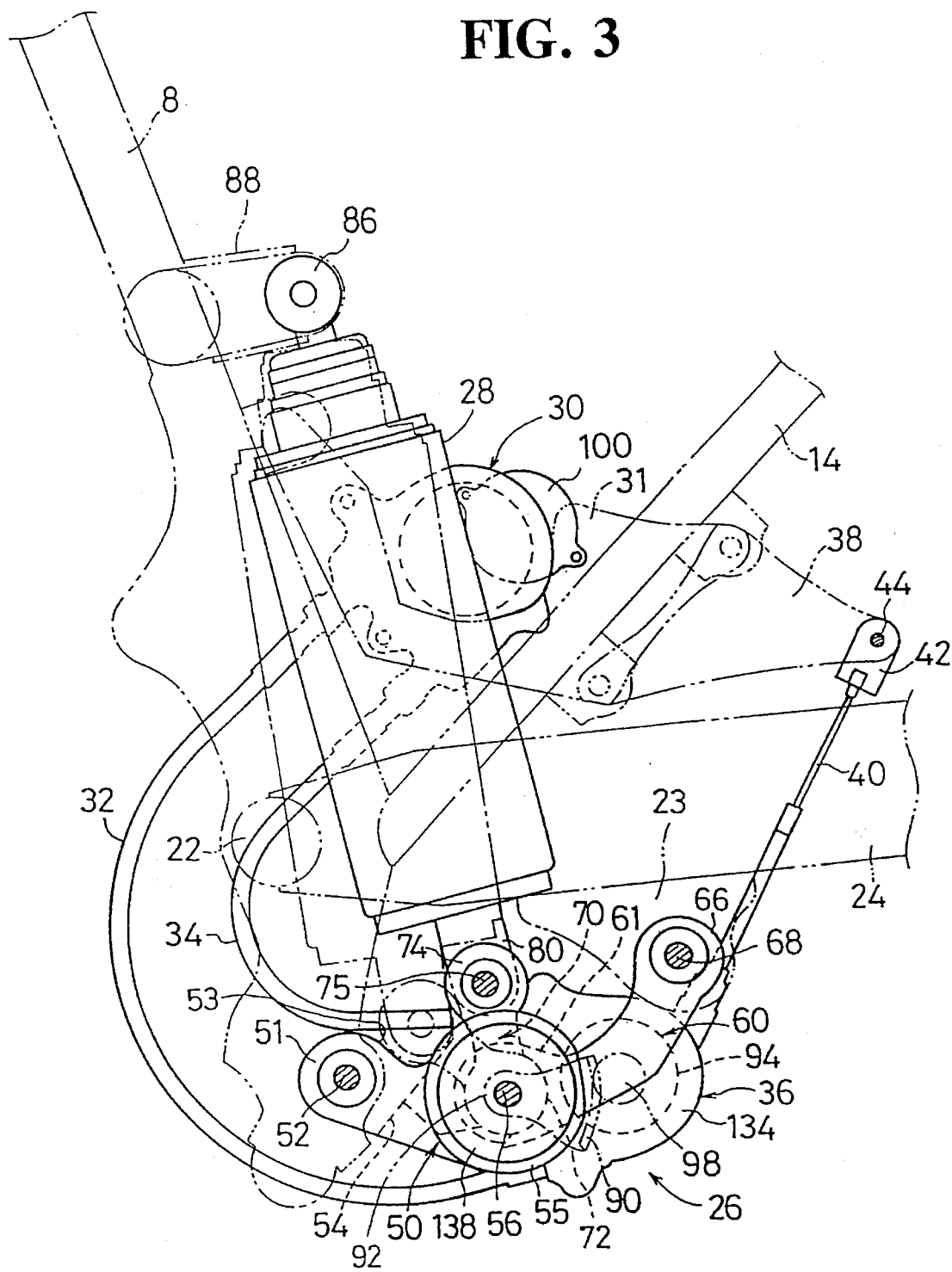
FIG. 3 is an enlarged view of an essential part of the motorcycle.

An embodiment will be described with reference to FIGS. 1 A–C and 8. FIG. 2 shows a side elevation of an essential part of a body of a motorcycle to which the present embodiment is applied. FIG. 3 shows a rear shock absorber section of the motorcycle in an enlarged scale.

Referring to these figures, a body frame 2 includes a loop structure section constituted from a main frame 4, a front down tube 6, a pivot frame 8 and a lower pipe 10, and a truss structure section extending rearwardly from the loop structure section and constituted from a seat rail 12 and a rear stay 14 and pivot frame 8. Engine 16 is supported on the loop structure section. A fuel tank 18 is supported on the main frame 4 while a seat 20 is supported on the seat rail 12.

A front end of a rear swing arm 24 is mounted for pivotal motion on the pivot frame 8 by means of a pivot 22. A rear wheel 25 is supported for rotation at a rear end portion of the rear swing arm 24. The rear swing arm 24 is connected on a front portion side thereof to a rear shock absorber 28 by way of a shock absorber link mechanism 26. The shock absorber link mechanism 26 is located below the rear swing arm 24. A mounting boss 86 formed at an upper end portion of the rear shock absorber 28 is connected to a bracket 88 which projects from the pivot frame 8 (see FIG. 3).

As can be seen in FIG. 3, an actuator 30 which serves as a driving side member of driving means of a motorcycle height adjustment mechanism is provided in the proximity of the rear shock absorber 28, and a pair of wires 32 and 34 which serve as motion transmission members of the driving means are connected to a driven portion 36 of the shock absorber link mechanism 26. A sub wire 40 is connected between the driven portion 36 and a bracket 38 provided on the rear stay 14. The driven portion 36 is a driven side member of the driving means and constitutes the shock absorber link mechanism 26 together with a link arm assembly described below.

The link arm assembly of the shock absorber link mechanism 26 includes the first link arm 50, a second link arm 60 and a shock absorber link arm 70. The first link arm 50 is supported at a frame side boss 51 thereof for pivotal motion at a lower portion of the pivot frame 8 by a shaft 52. The other boss 55 of the first link arm 50 is connected for relative rocking motion to a boss 61 of the second link arm 60 and a link side boss 72 of the shock absorber link arm 70 by an arm connecting shaft 56.

In the present embodiment, the driven portion 36 is integrated with the shock absorber link arm 70. It is to be noted that, in the present embodiment, the link form can be varied by rocking the shock absorber link arm 70 until it is selectively contacted with either the first link arm 50 or the second link arm 60 so as to establish integral motion of them as hereinafter described. Thus, the driven portion 36 is provided on the first link arm side of the link form which makes a more normally used side, in the present embodiment. However, the driven portion 36 may be provided on the second link arm side.

The actuator 30 is secured to a bracket 31 mounted between the pivot frame 8 and the rear stay 14. The driven portion 36 is integrated with the shock absorber link mechanism 26 and integrally connects, at a boss portion 92 of sectoral toothed gear 90 to the arm connecting shaft 56.

Figure 4:
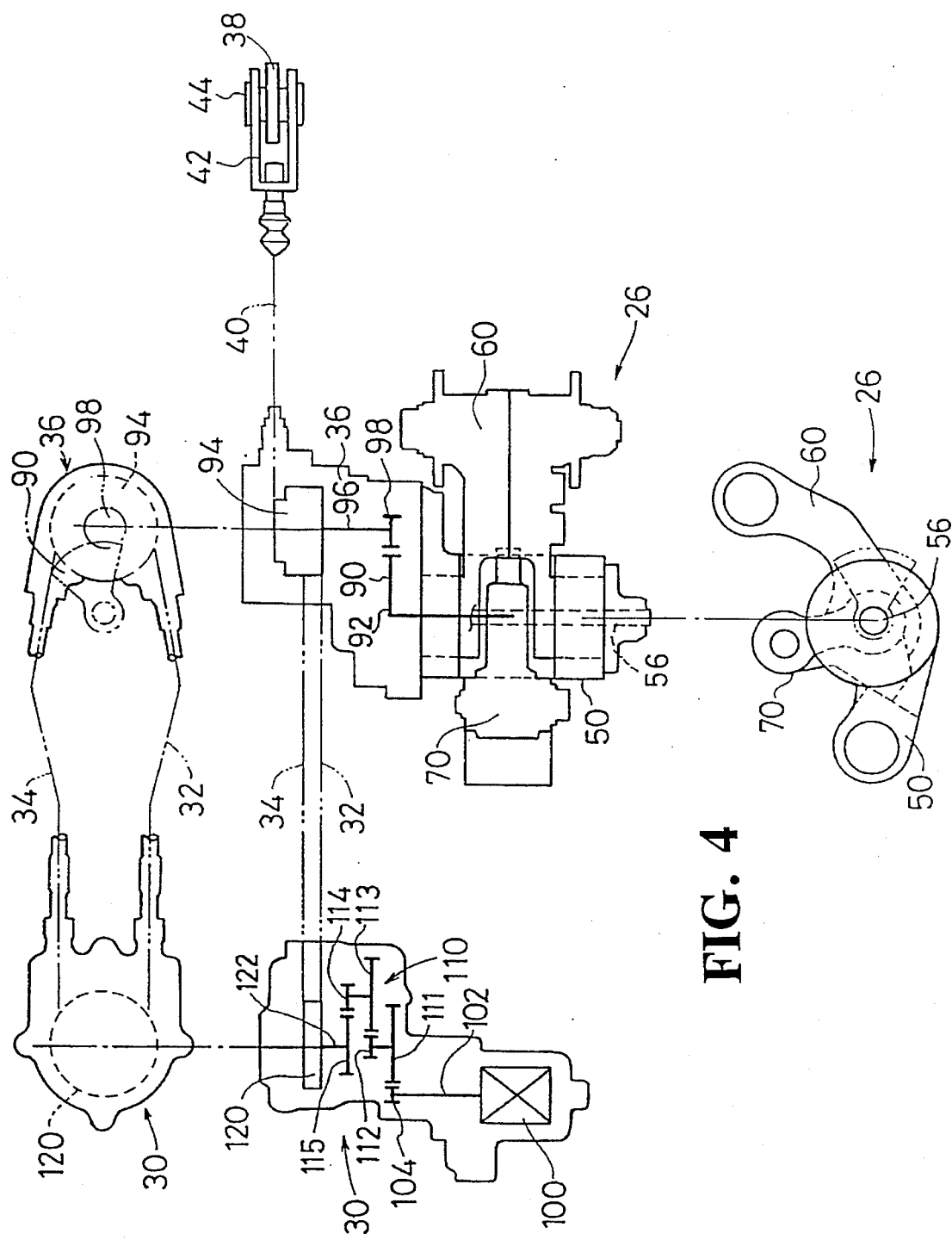
FIG. 4 shows a side elevation of the actuator driven portion and shock absorber link mechanism in combination with a plan view of the actuator and shock absorber link mechanism of the first embodiment to show the functional relationship of these elements.
Figure 5:
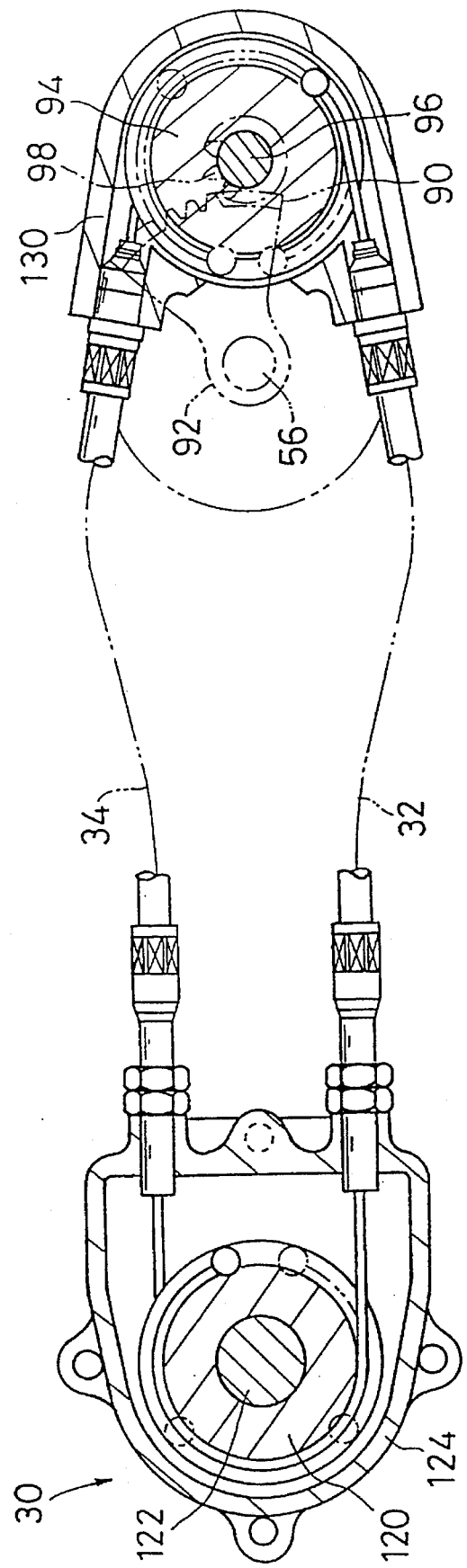
FIG. 5 is an enlarged sectional view showing the actuator and the driven portion of the first embodiment.
Figure 6:
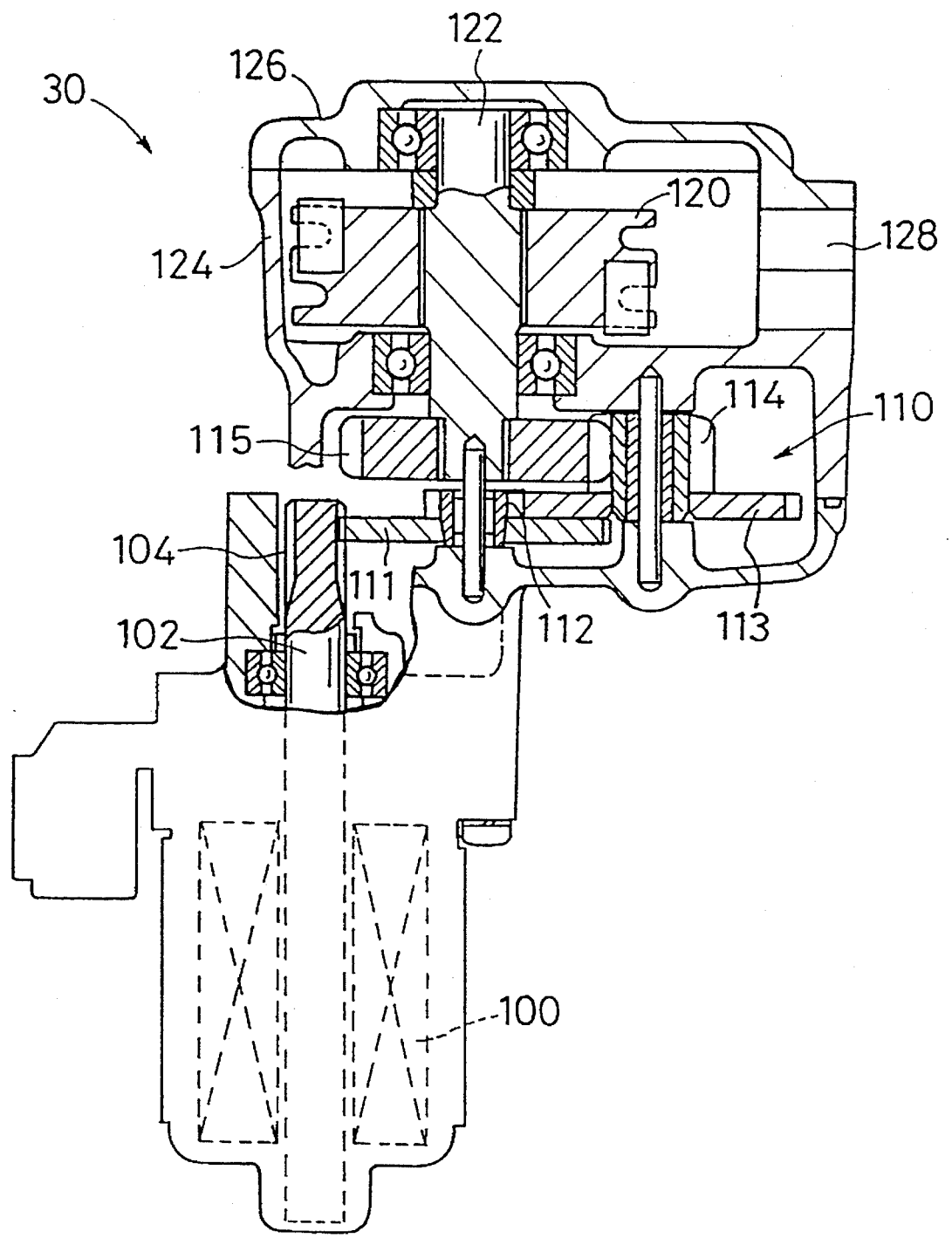
FIG. 6 is an enlarged sectional view showing the actuator of the first embodiment.
Figure 7:
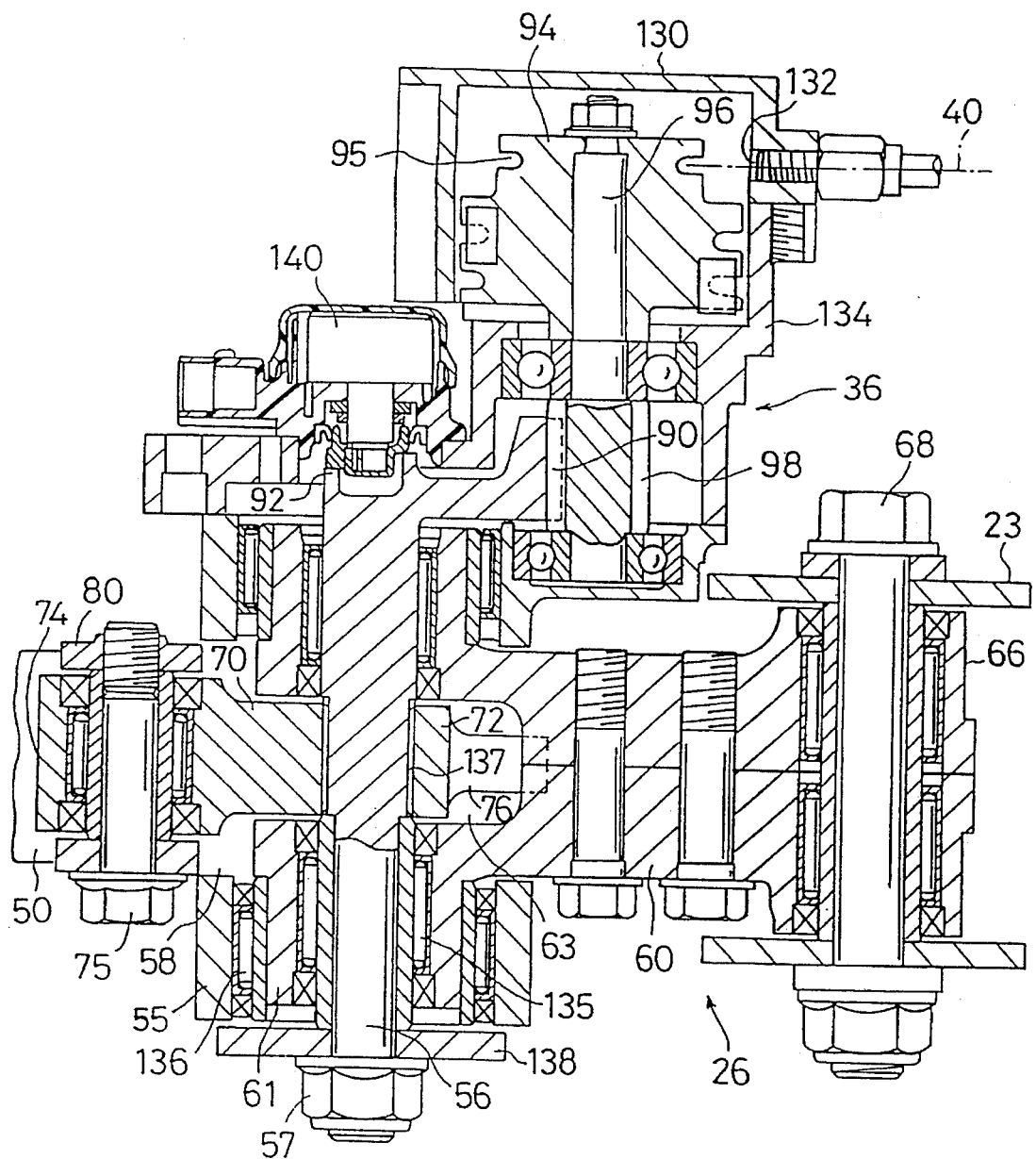
FIG. 7 is an enlarged sectional view taken along line 7—7 of FIG. 8.
Figure 8:
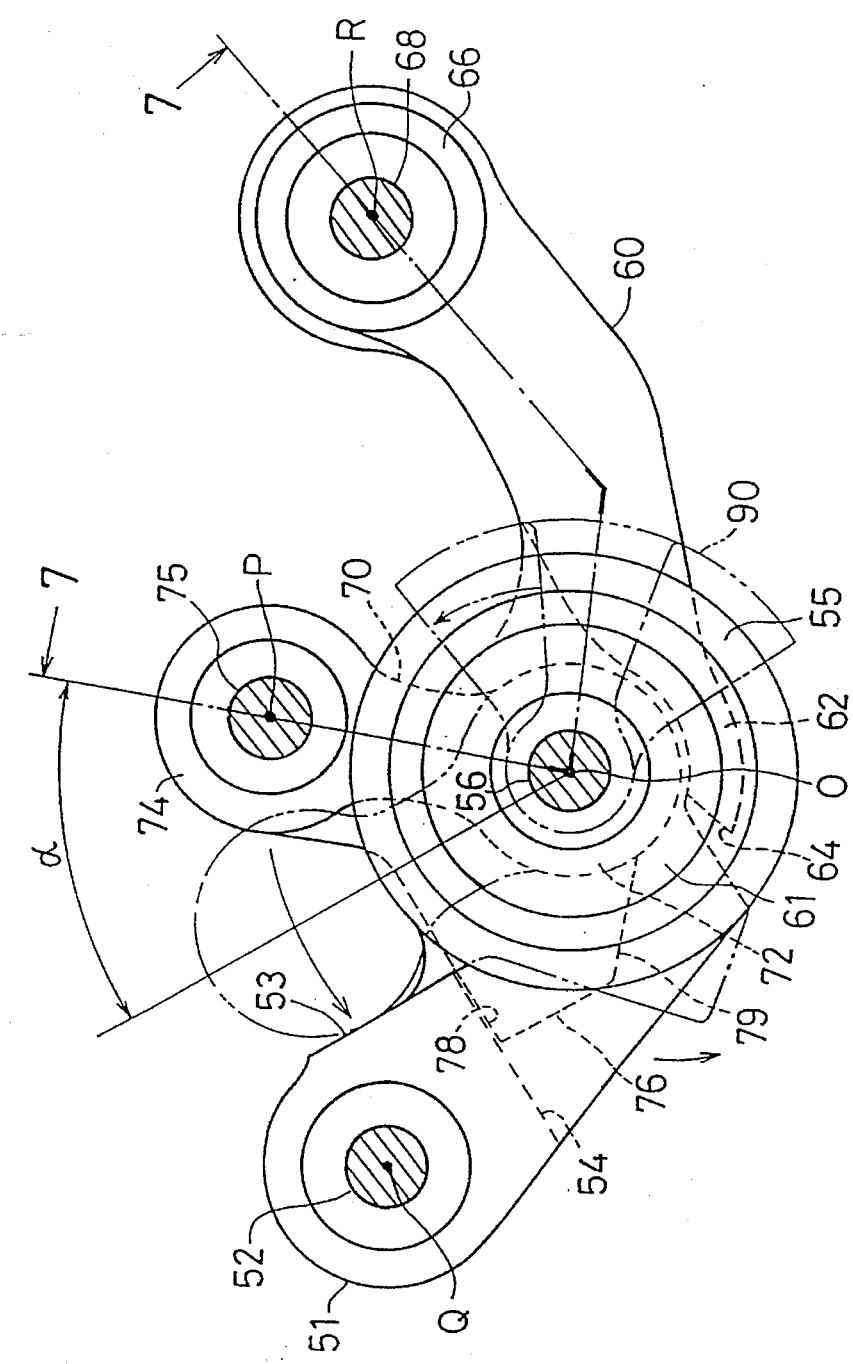
FIG. 8 is a schematic side elevational view, with some parts omitted, of the shock absorber link mechanism of the first embodiment.

FIG. 4 is a schematic view showing a general construction and functional relationship of the motorcycle height adjustment mechanism in the present embodiment. FIG. 4 shows a side elevation of the actuator 30 shock absorber link mechanism 26 and the driven portion 36 a plan view of the actuator 30 and the shock absorber link mechanism 26. Further, a side elevation section of the actuator 30 and the driven portion 36 is shown in FIG. 5. A horizontal section of the actuator 30 is shown in FIG. 6. A section (taken along line 7—7 of FIG. 8) of the shock absorber link mechanism 26 is shown in FIG. 7, and an enlarged side elevation of essential part of the shock absorber link mechanism 26 is shown in FIG. 8.

Referring to FIGS. 4, 5 and 6, the actuator 30 includes a motor 100. Motor shaft 102 transmits rotation from motor 100 to a motor output gear 104 (formed on an end of motor shaft 102) which transmits rotation to a drive pulley 120 by way of a speed reduction mechanism 110. The speed reduction mechanism 110 is constituted from, for example, speed reduction gears 111, 112, 113, 114 and 115.

Pulley shaft 122 has one end spline-coupled to speed reduction gear 115 and the other end spline-coupled to drive pulley 120. Drive pulley 120 is rotated at a reduced speed relative to rotation of the motor output gear 104 of the motor 100 due to speed reduction mechanism 110.

As can be seen in FIG. 6, the actuator 30 including the drive pulley 120 is covered with an actuator body 124 and a body cover 126. An opening 128 is provided for passing the wires 32 and 34 through actuator body 124.

As shown in FIGS. 4, 5 and 7, a driven pulley 94 to which the wires 32 and 34 are connected forms the driven portion 36 together with the sectoral toothed gear 90. The sectoral toothed gear 90 is held in meshing engagement with a driven gear 98 formed at an end of a pulley shaft 96 which has the driven pulley 94 mounted at the other end thereof.

It is to be noted that, as apparent from FIG. 7, a sub-wire groove 95 is formed on an outer periphery of an end portion in an axial direction of the driven pulley 94, and the sub-wire 40 entering from an opening 132 of an arm case cover 130 is connected at an end portion thereof to the sub-wire groove 95. The case cover 130 is connected in the proximity of the driven pulley 94 to an arm case 134 in which the sectoral toothed gear 90 and the driven gear 98 are accommodated.

The sub-wire 40 is connected at the other end thereof to a substantially U-shaped joint member 42 as apparent from FIGS. 3 and 4. The joint member 42 is mounted for rotation on the bracket 38 by means of a joint shaft 44. Consequently, when the driven pulley 94 is rocked so as to decrease the height of the motorcycle, the rear stay 14 and the shock absorber link mechanism 26 are drawn toward each other so that the rear shock absorber 28 may not be extended.

Referring again to FIG. 7, the first link arm 50 has a space 58 formed at a central portion thereof in a motorcycle widthwise direction except a portion thereof in the proximity of the frame side boss 51. The space 58 accommodates the rocking motion of shock absorber link arm 70. A portion of one end of the first link arm 50 in the proximity of the frame side boss 51 at which the space 58 is not formed is employed as a stopper contacting portion 54 (see FIG. 8) for the shock absorber link arm 70 at the normal motorcycle height position.

The second link arm 60 is divided into two parts in the motorcycle widthwise direction. Mating faces of the second link arm 60 in the proximity of the arm connecting shaft 56 define a space 63 therebetween for fitting a portion of the link side boss 72 of the shock absorber link arm 70 therein so as to allow rocking motion of the shock absorber link arm 70.

A stepped portion 62 is disposed below the space 63 such that it extends downwardly and partially surrounding an outer periphery of the link side boss 72 and further extends forwardly as shown in FIG. 8. An end portion of the stepped portion 62 forms a stopper contacting portion 64. A swing arm side boss 66 of the second link arm 60 is connected so as to allow for rocking motion with respect to a bracket 23 provided on the rear swing arm 24 (see FIGS. 2 and 3) by means of a shaft 68.

As can be seen in FIG. 8, the shock absorber link arm 70 is a member having a substantially dumbbell-like side elevation having a constricted intermediate portion between the boss portions 72 and 74 at the opposite ends thereof. The link side boss 72 is connected to the shock absorber link mechanism 26 by way of the arm connecting shaft 56 while the shock absorber side boss 74 is connected to a bracket 80 formed at a lower end portion of the rear shock absorber 28 by means of a shaft 75 (see FIG. 3).

A stopper 76 is formed integrally on a side face of the shock absorber link arm 70 adjacent the first link arm 50 such that it projects in an overlapping relationship with a side face of the first link arm 50. A first contacting face 78 for contacting with the stopper contacting portion 54 of first link arm 50 and a second contacting face 79 for contacting with the stopper contacting portion 64 at second link arm 60 are formed on a side portion of the stopper 76.

Figure 11:
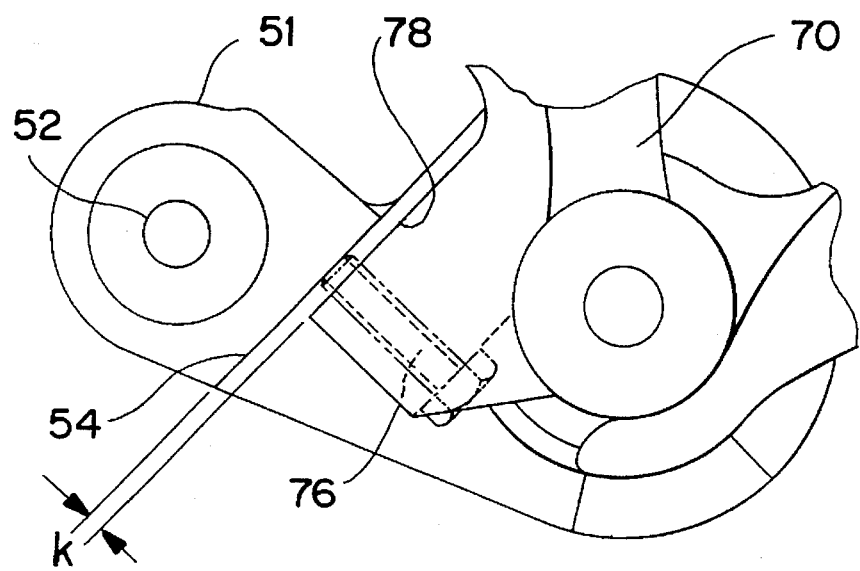
FIG. 11 is a schematic side elevation view, with some parts omitted, of an exemplary clearance adjust mechanism of the invention.

Furthermore, stopper 76 can be provided with a clearance adjust mechanism that adjusts the clearance between the first contacting face 78 and the stopper contacting portion 54. An example of such a clearance adjust mechanism is shown in FIG. 11 which depicts a stopper adjust bolt provided on stopper 76 that is capable of adjusting the clearance between first contacting face 78 and the stopper contacting portion 54. By employing a clearance adjust mechanism such as the stopper adjust bolt in FIG. 11, the link form can be varied and the rocking motion of the shock absorber link form can be controlled to a plurality of stages.

As shown in FIG. 7, the boss 61 of the tubular second link arm 60 is fitted around the arm connecting shaft 56 with a roller bearing 135 interposed therebetween, and a boss portion 55 of the first link arm 50 is fitted around the boss 61 of the second link arm 60 with another roller bearing 136 interposed therebetween.

A grooved portion for communicating with the internal space 63 is formed at an intermediate portion of each of these tubular boss portions 55 and 61 in an axial direction by cutting away an outer peripheral portion of the intermediate portion, and the link side boss 72 of the shock absorber link arm 70 which extends into the space 63 through the grooved portions is coupled to a spline portion 137 formed at an intermediate portion of the arm connecting shaft 56.

An end portion of the arm connecting shaft 56 is secured by a nut 57 with a washer 138 interposed therebetween. It is to be noted that a movable portion of an angle sensor 140 for detecting an angle of rotation of the arm connecting shaft 56 is connected to the boss portion 92 of the sectoral toothed gear 90 at the other end portion of the arm connecting shaft 56 in the axial direction. A body portion of the angle sensor 140 is supported on the link arm case 134 side. The motor 100 can be controlled by known suitable means, such as an electronic feedback controller, in response to the angle sensor 140 such that, when a detection angle of the arm connecting shaft 56 is smaller than a predetermined angle $\alpha$, the motor 100 is driven until the angle becomes equal to $\alpha$.

Solid lines in FIG. 8 shows an enlarged side elevational view (wherein the washer 138 is omitted) of the motorcycle height adjustment mechanism in a normal condition in which there is no load of a driver. Center P of the shock absorber side boss 74 (which is a mounting point for the lower end of the rear shock absorber) is moved, upon adjustment of the motorcycle height, forwardly by the angle $\alpha$ from a normal position indicated by a solid line to another position indicated by dashed lines in which the height of the motorcycle is reduced. While the present angle $\alpha$ can be determined based upon the specifications of the motorcycle body, it is about 40° in the present embodiment.

Figure 1:
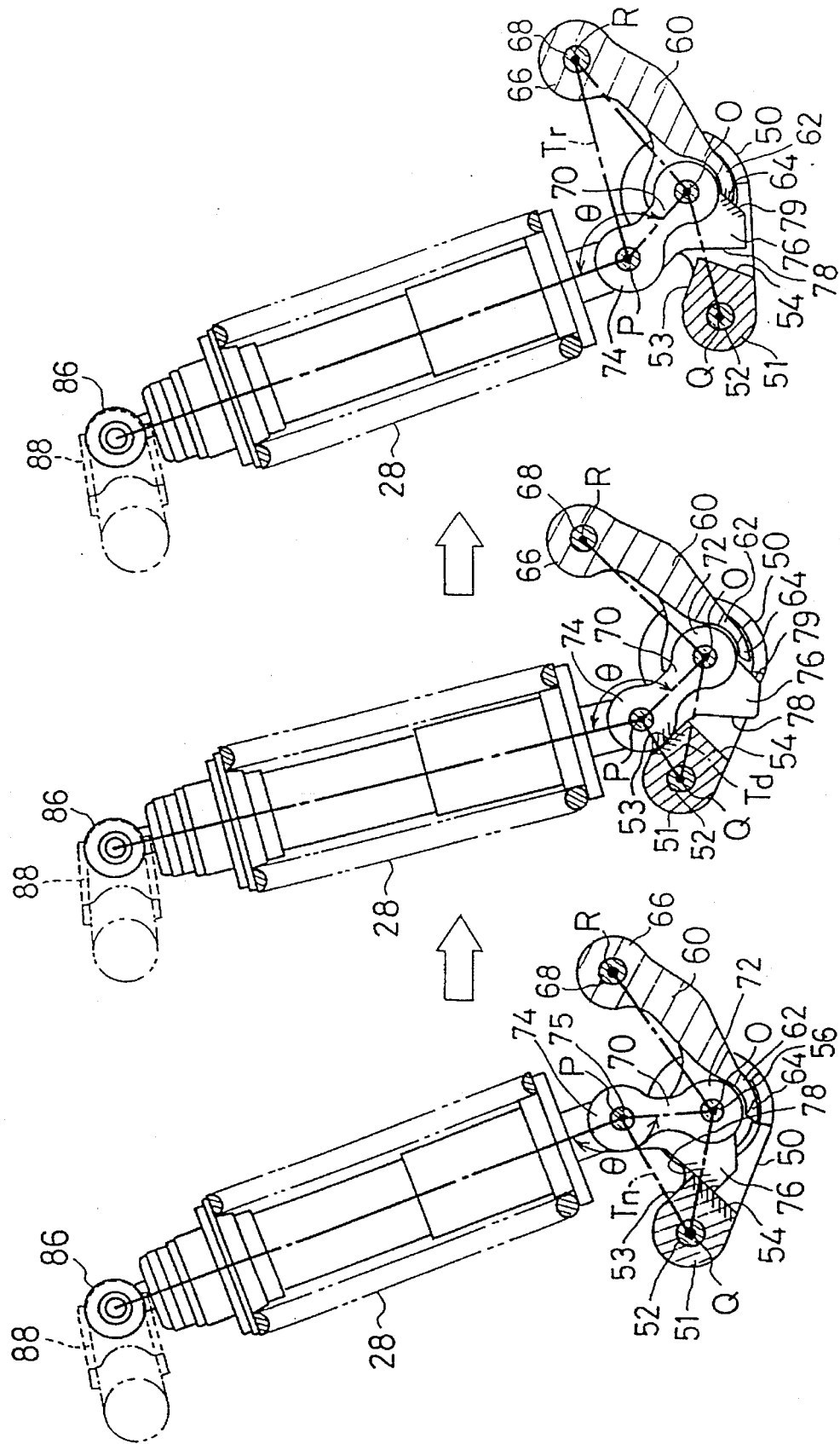
FIGS. 1(A), 1(B), and 1(C) are views illustrating action of a first embodiment.

FIG. 1 is a view illustrating operation of the present embodiment, and the normal condition is shown in FIG. 1(A), another condition wherein the height of the motorcycle is reduced is shown in FIG. 1(B), and a further condition wherein the link form is varied is shown in FIG. 1(C). It is to be noted that the shock absorber link mechanism 26 is shown schematically, and the shock absorber link arm is shown not in section at a portion corresponding to a section of a central portion in the motorcycle widthwise direction in order to show the shock absorber link arm 70.

As is apparent in FIG. 1(A) which shows the shock absorber link arm 70 when it is at the normal position (also referred to as link form 1(A)), the first contacting face 78 is pressed against the stopper contacting portion 54 of the first link arm 50 such that a triangle Tn interconnecting the center Q of the shaft 52, the center 0 of the arm connecting shaft 56 and the center P of the shock absorber side boss 74 is formed (slanting lines are provided at the contacting portion of the stopper 76), and the link ratio is comparatively low.

On the other hand, in the condition as shown in FIG. 1(B) (corresponding to link form 1(B)) wherein the height of the motorcycle is low, the shock absorber link arm 70 is pressed against, at an outer peripheral portion of the shock absorber side boss 74 thereof, a stopper contacting face 53 of the frame side boss 51 such that another triangle Td is formed to thereby increase the link ratio. In this instance, the stopper 76 does not contact either the stopper contacting portion 54 or the stopper contacting portion 64 on the second link arm 60.

Further, by rocking the shock absorber link arm 70 at a stage wherein a shock absorber stroke is produced by motion of the rear swing arm as shown in FIG. 1(C), the second contacting face 79 of the stopper 76 can be contacted with the end of the stopper contacting portion 64 on the second link arm 60 side resulting in link form 1(C). In this instance, triangle Tr is formed among the points P and 0 and the center R of the shaft 68 on the second link arm 60, and the link form varies to a link form quite different from those link forms of FIGS. 1(A) and 1(B). The link ratio in this instance can be set to any higher or lower link ratio value with respect to the link forms of FIGS. 1(A) and 1(B).

It is to be noted that, in any of the cases shown in FIGS. 1(A), 1(B) and 1(C), an angle $\theta$ between the center lines of the shock absorber link arm 70 and the rear shock absorber 28 is set so that it does not exceed 180° over the entire range of the shock absorber stroke without fail, and unless the shock absorber link arm 70 is rocked, the pressing direction of the shock absorber link arm 70 is not reversed. As a result, the triangles Tn, Td and Tr always keep their respective shapes fixed when the shock absorber link mechanism is rocked together with the rear swing arm.

Subsequently, operation of the present embodiment will be described. In the link form 1(A) shown in FIG. 1(A), the shock absorber link arm 70 is at its normal position, and the first contacting face 78 of the stopper 76 provided on the shock absorber link arm 70 is pressed against the stopper contacting portion 54 of the first link arm 50 thereby fixing the shape of triangle Tn. Because triangle Tn is fixed, the motion of rear swing arm moves the shock absorber link arm 70 and the first link arm 50 integrally. This link system is in a balanced condition while the link ratio is comparatively low, and pushes up, in a stationary load condition, the connecting point bracket 88 to the mounting boss which is an upper end portion of the rear shock absorber 28, and consequently, the height of the motorcycle is comparatively high.

When a driver desires to decrease the height of the motorcycle (such as when the driver gets off the motorcycle, stops the motorcycle temporarily or is driving very slowly) the shock absorber link arm 70 is rocked forwardly by the angle $\alpha$ (see FIG. 8) while the driver remains on the motorcycle, causing the height of the motorcycle to automatically change to a low condition as shown in FIG. 1(B). This operation is performed (as seen in FIGS. 3 and 4) by operating the actuator 30 whereby the motor shaft 102 is rotated by the motor 100, the drive pulley 120 is rotated by the rotation of motor shaft 102 whose speed is reduced by the speed reduction mechanism 110, whereupon the wire 34 is pulled.

Consequently, the driven pulley 94 to which the wire 34 is connected is rotated, and the sectoral toothed gear 90 (that is held in meshing engagement with the driven gear 98 and which rotates integrally with the driven pulley 94) is rotated so that the arm connecting shaft 56 integral with the sectoral toothed gear 90 is rotated. As a result, the shock absorber link arm 70 is rapidly rocked forwardly so that the first contacting face 78 of the stopper 76 is spaced away from the stopper contacting portion 54 of the first link arm 50 while the outer peripheral face of the shock absorber side boss portion 74 which is an end portion of the stopper 76 is pressed against the stopper contacting face 53 of the first link arm 50, whereupon the triangle Tn varies to the triangle Td to change the link ratio to a higher value. However, the shock absorber link arm 70 and the first link arm 50 still move integrally with each other.

As a result, since the balanced condition of the shock absorber link mechanism 26 is varied, the rear shock absorber 28 is compressed so that the position of the bracket 88 (which is a connection point on the upper end side of the rear shock absorber 28 with respect to the road) is lowered to decrease the height of the motorcycle. Simultaneously, the sub-wire 40 is taken up by the rotation of the driven pulley 94 and is in tension between the shock absorber link mechanism 26 and the bracket 38 (which is mounted on the rear stay 14 which is part of the body frame 2).

Figure 13A:
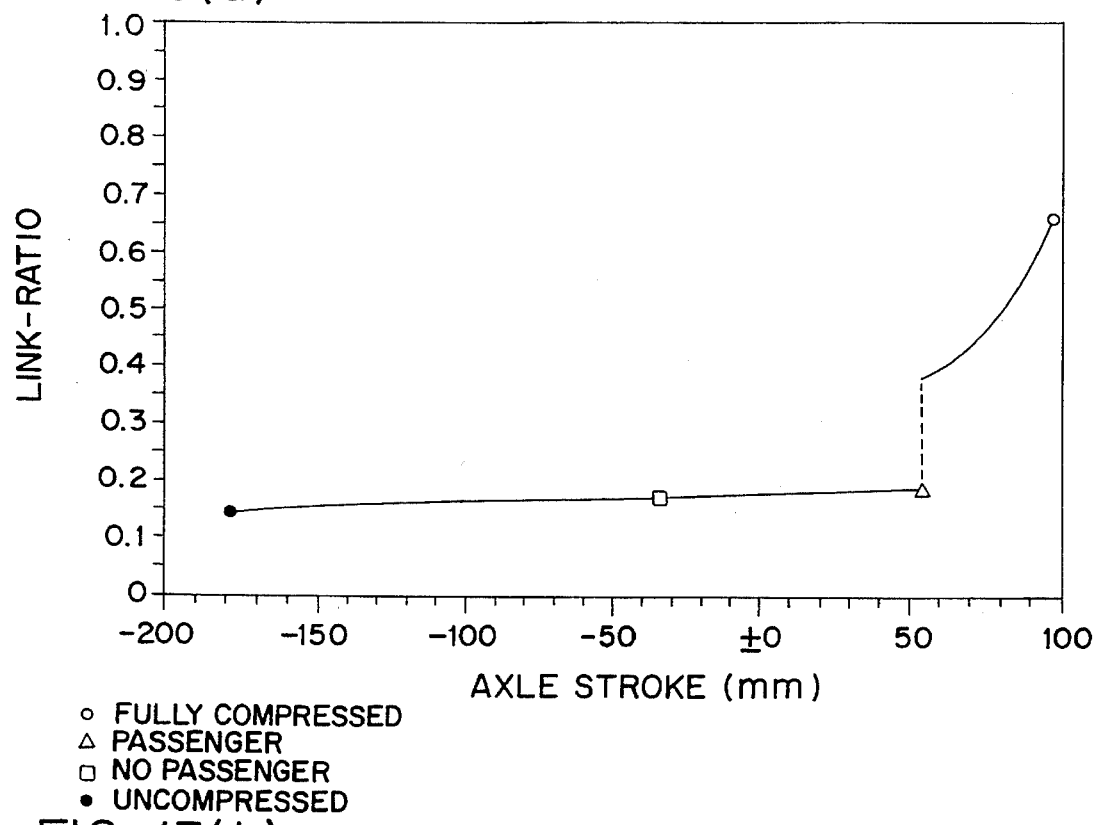
FIGS. 13(A) and 13(B) are graphs showing link ratio and link force characteristics of the link forms shown in FIGS. 1(A), 1(B), and 1(C) when the link form is changed.
Figure 13B:
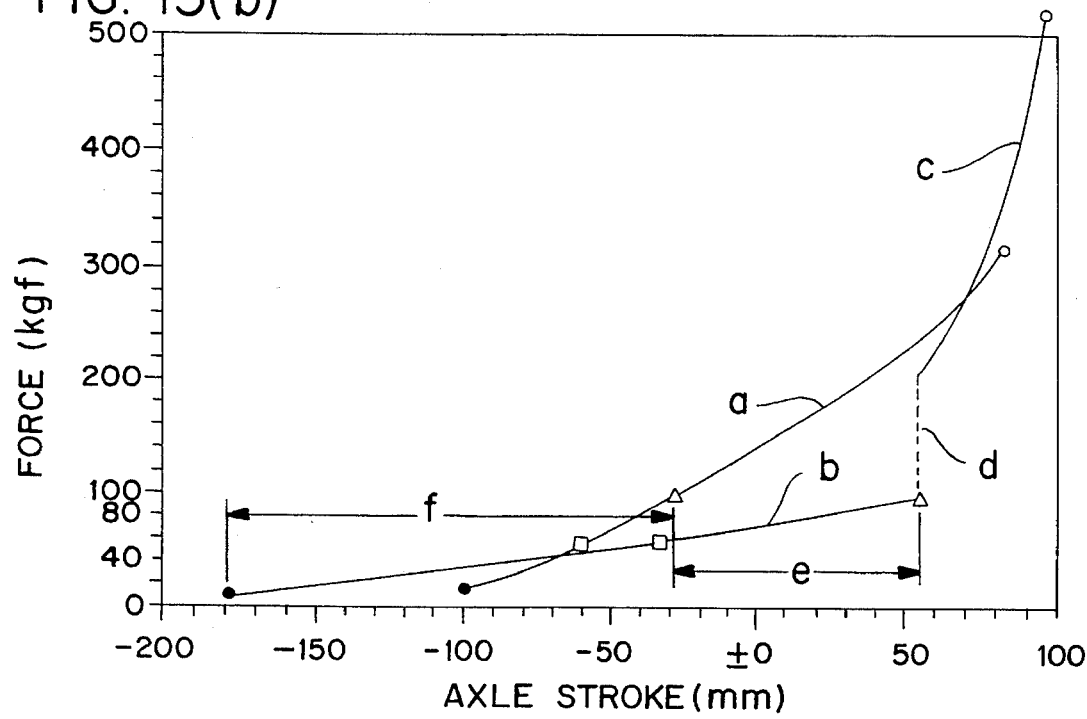

Consequently, even if the motorcycle stops in a condition wherein the driver decreases the height of the motorcycle and then the driver gets off the motorcycle, although the rear wheel sharing load is decreased as a result of the driver getting off and a force to push up the bracket 88 acts due to a reactive force of the rear shock absorber 28, since the sub-wire 40 draws the bracket 38 toward the shock absorber link mechanism (as graphically depicted in FIG. 13(B)), the height of the motorcycle can be prevented from being increased.

On the other hand, when the driver gets on the motorcycle, if the height of the motorcycle is decreased in advance by the operation described above, then getting on is facilitated. If the actuator 30 is then rendered operative (e.g., after the motorcycle is started) to rock the shock absorber link arm 70 in the reverse direction from the link form 1(B) shown in FIG. 1(B) to the link form 1(A) shown in FIG. 1(A), then the link ratio varies in a decreasing direction, and simultaneously the sub-wire 40 is slackened by the reverse rotation of the driven pulley 94. Consequently, the height of the motorcycle is increased to the normal motorcycle height condition as shown in FIG. 1(A).

The actuator 30 can be triggered with a manual switch located, for example, on the steering handle permitting the driver to trigger the actuator 30 and thereby change the link form at any desired time. An automatic switch can also be used to trigger the actuator by detecting the velocity of the motorcycle and triggering the actuator to lower the motorcycle when the velocity of the motorcycle falls below a first predetermined value and triggering the actuator to raise the motorcycle when the velocity of the motorcycle exceeds a second predetermined value. The first and second predetermined values are preferably different from one another to prevent teasing of the actuator. A delay or other teasing prevention method could also be used to prevent repeated motorcycle height lowering and raising near a single trigger velocity.

Since adjustment of the height of the motorcycle is automatically performed at an appropriate time and when necessary in this manner, adjustment of a suspension condition while the driver remains on the motorcycle (which is impossible with conventional manual adjustment) is permitted.

The link forms 1(A) and 1(B) of FIGS. 1(A) and 1(B) are normally used side link forms in the present embodiment, and since the driven portion 36 is mounted on the first link arm 50; the first link arm 50, the driven portion 36 and the shock absorber link arm 70 move integrally with one another. Consequently, even if the rear swing arm 24 is rocked, the arm connecting shaft 56 does not turn relative to the driven portion 36, and as a result, the sectoral toothed gear 90 of the driven portion 36 is required to rotate only by an amount sufficient to achieve changing over between link form 1(A) and link form 1(B). Accordingly, the sectoral toothed gear 90 can be formed in a small size.

Further, if the shock absorber link arm 70 during a shock absorber stroke in FIG. 1(B) is rocked toward the second link arm 60 side so as to be changed over to the link form 1(C) of FIG. 1(C), then the second contacting face 79 of the stopper 76 can be pressed against the stopper contacting portion 64 of the second link arm 60 before the outer peripheral portion of the shock absorber side boss 74 and the stopper contacting face 53 are contacted with each other and the stopper contacting portion 54 and the first contacting face 78 are contacted with each other.

Figure 12A:
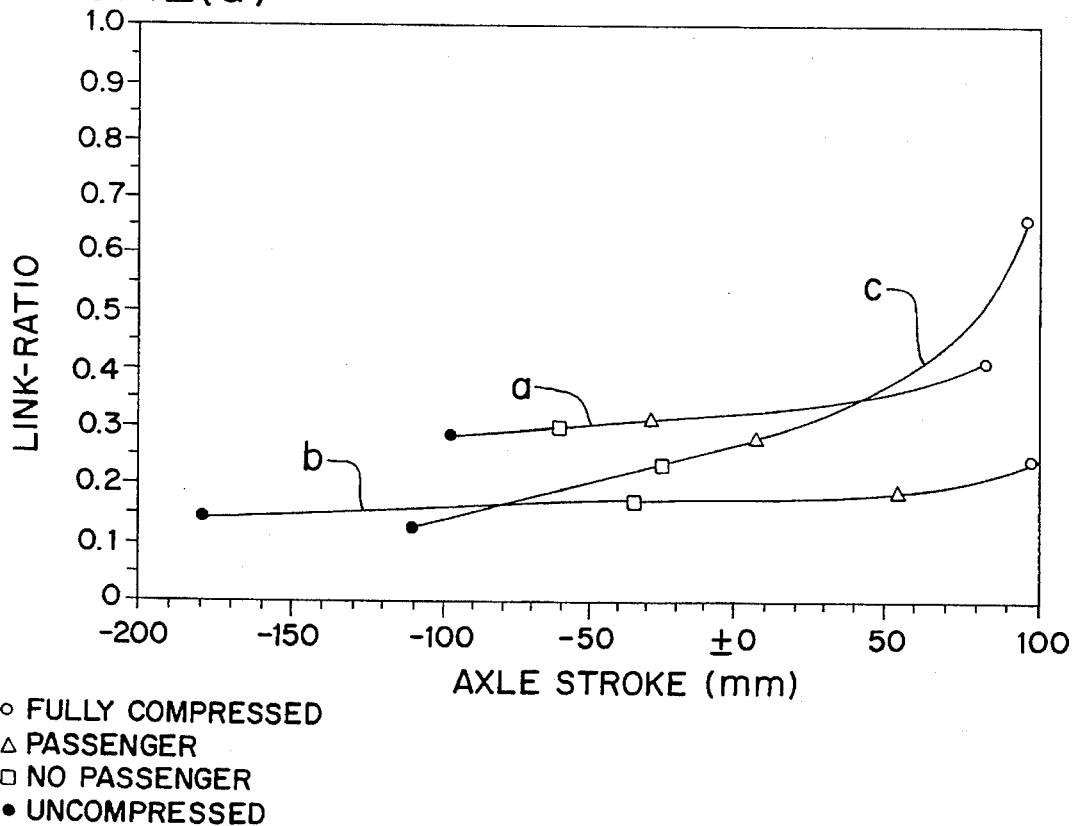
FIGS. 12(A) and 12(B) are graphs showing the link ratio versus axel stroke and axel force versus axel stroke for the link forms shown in FIGS. 1(A), 1(B), and 1(C)
Figure 12B:
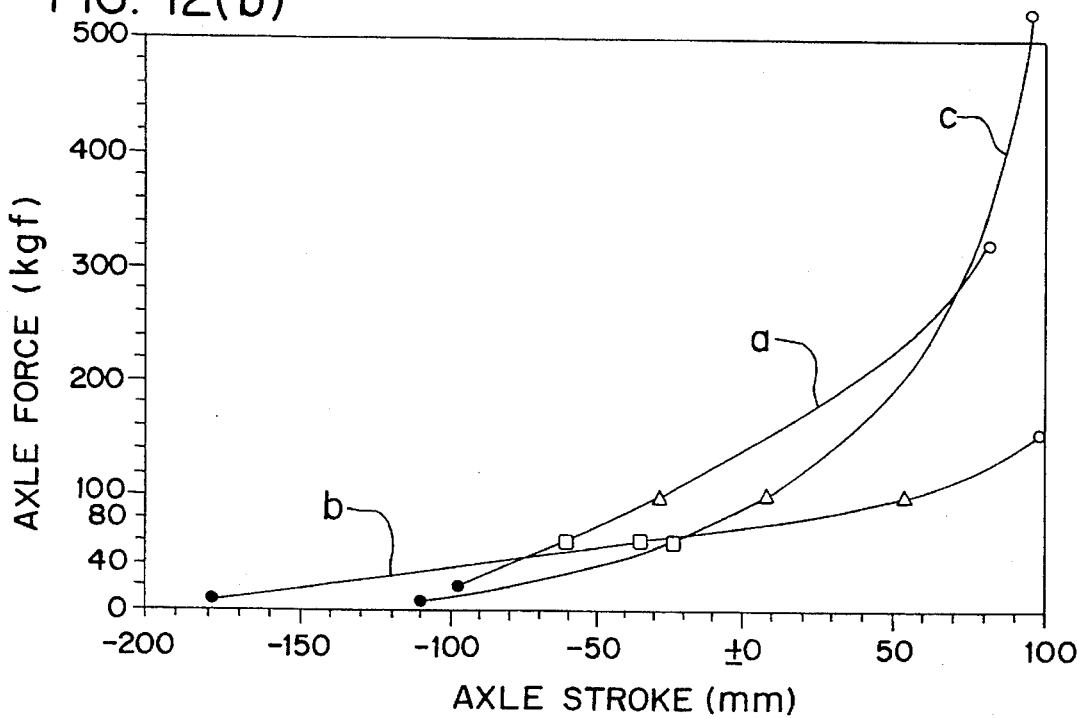

By such construction, since the triangle Tn changes to the triangle Tr and the link form 1(A) varies to a link form 1(C) in which the shock absorber link arm 70 moves integrally with the second link arm 60, the link ratio can be varied by a great amount so that an ideal shock absorber load characteristic can be exhibited even in such a running condition as may not be adapted by the link form 1(A) shown in FIG. 1(A), and also ideal shock absorber load characteristics suitable for various running conditions can be realized as shown in FIGS. 12(*a*) and 12(*b*).

It is to be noted that the link form is set such that the movement of the shock absorber link arm 70 for varying such link form to vary the contacting point with the second link arm 60 side occurs naturally at a point of time when the amount of rocking motion of the rear swing arm 24 and the amount of the stroke of the rear shock absorber 28 exceed predetermined boundary values as shown in FIGS. 13(*a*) and 13(*b*). However, it is also possible to compulsorily rock the shock absorber link arm 70 by a motor drive.

Figure 15:
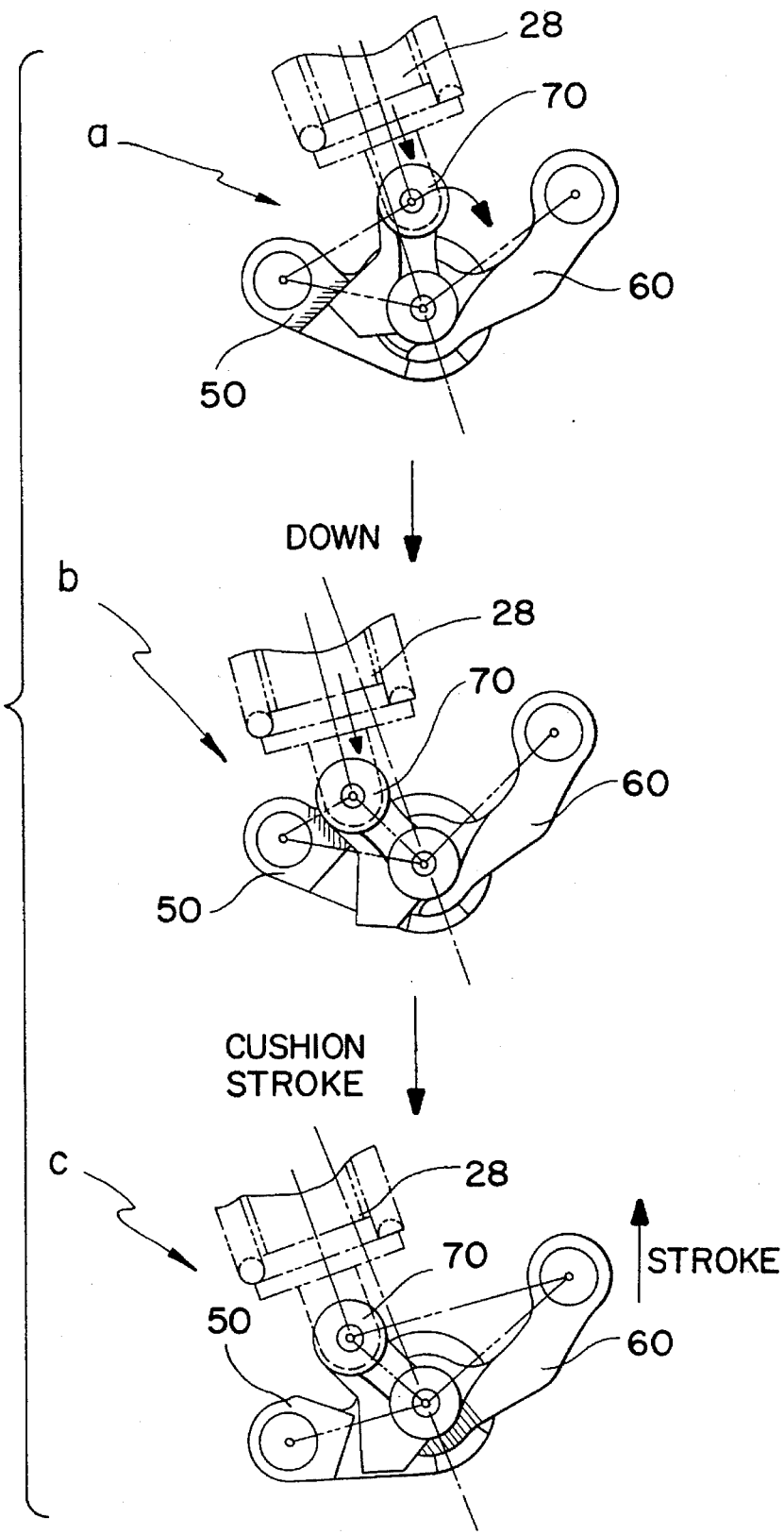
FIG. 15 is a composite diagram showing the three link forms.
Figure 16A:
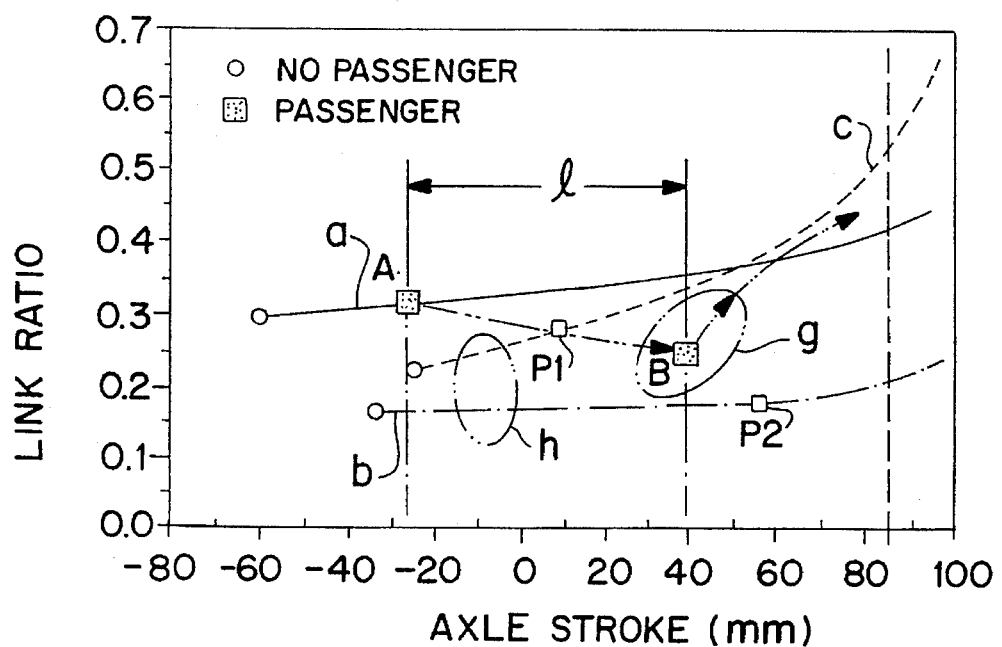
FIGS. 16(A) and 16(B) show how each link form performs under dynamic conditions.
Figure 16B:
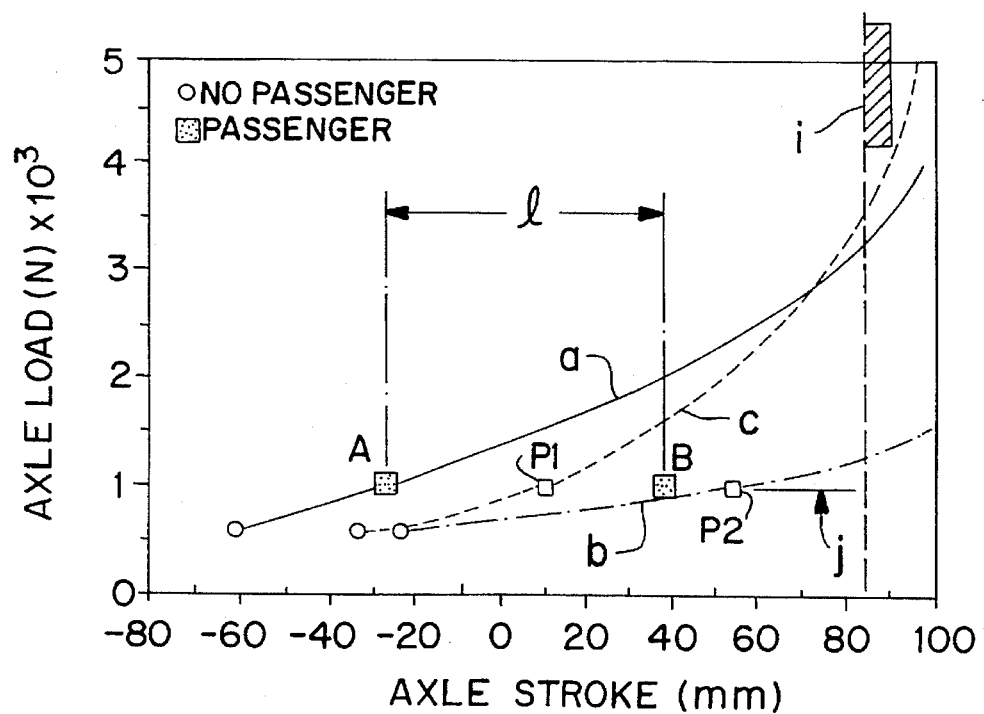

FIG. 15 summarizes the three link forms 1(A), 1(B), and 1(C) and graphically depicts the performance of each link form in terms of link ratio versus axel stroke and axel load versus axel stroke. FIG. 15 also shows the positional relationship between the first link arm 50, the second link arm 60, and the shock absorber link arm 70 for each of the three link forms 1(A), 1(B), and 1(C).

Further, as shown in FIG. 3, since the shock absorber link mechanism constituting the motorcycle height adjustment mechanism is provided at a lower portion of the rear shock absorber 28 and the shock absorber link mechanism 26 and the actuator 30 are provided separately from each other, the non-suspended load can be reduced as low as possible while the form wherein heavy members such as the driven portion 36 are provided on the lower side of the rear shock absorber 28 is adopted.

Since output power of rotation of the actuator 30 by the motor 100 is transmitted to the shock absorber link mechanism 26 by way of the wires 32 and 34, the motion of the shock absorber link mechanism 26 which is rocked together with the rear swing arm 24 is absorbed by the wires 32 and 34 and is not transmitted to the actuator 30. Consequently, the motor 100 is prevented from being driven by the movement.

Figure 9:
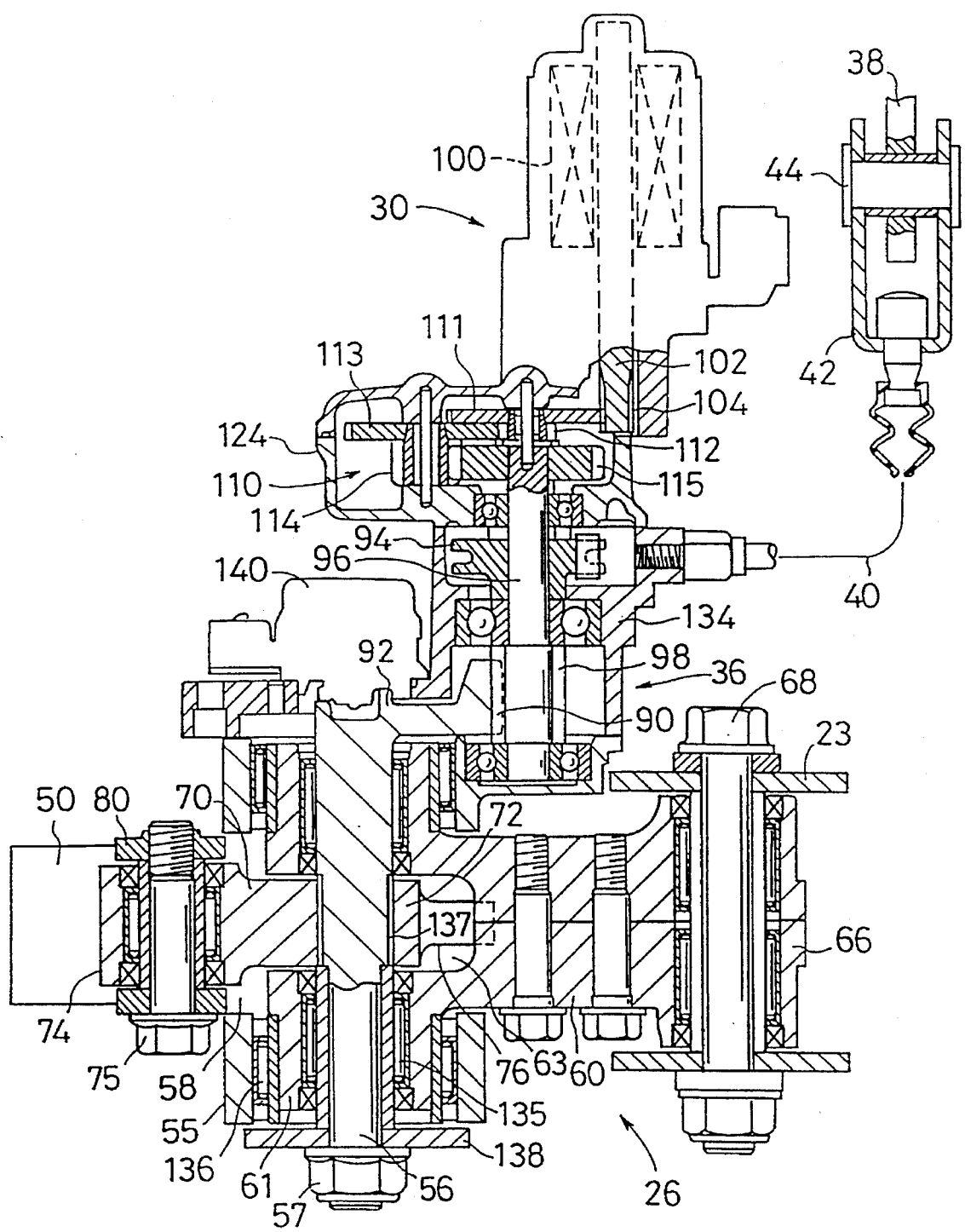
FIG. 9 is a sectional view of the shock absorber link mechanism and actuator of a second embodiment.

FIG. 9 is a view showing a second embodiment wherein the actuator and the shock absorber link mechanism are integrated with each other, and the actuator body 124 of the actuator 30 is mounted directly on the link arm case 134 while the fifth gear 115 constituting the speed reduction mechanism 110 of the motor 100 is mounted directly at an end portion of the pulley shaft 96.

By the construction, since the number of parts such as the drive pulley 120 can be reduced (see FIGS. 6 and 7), the weight and the cost can be reduced. It is to be noted that common elements to those of the preceding embodiment are denoted by same reference characters, and description of overlapping portions is omitted herein. This similarly applies to a third embodiment.

Figure 10:
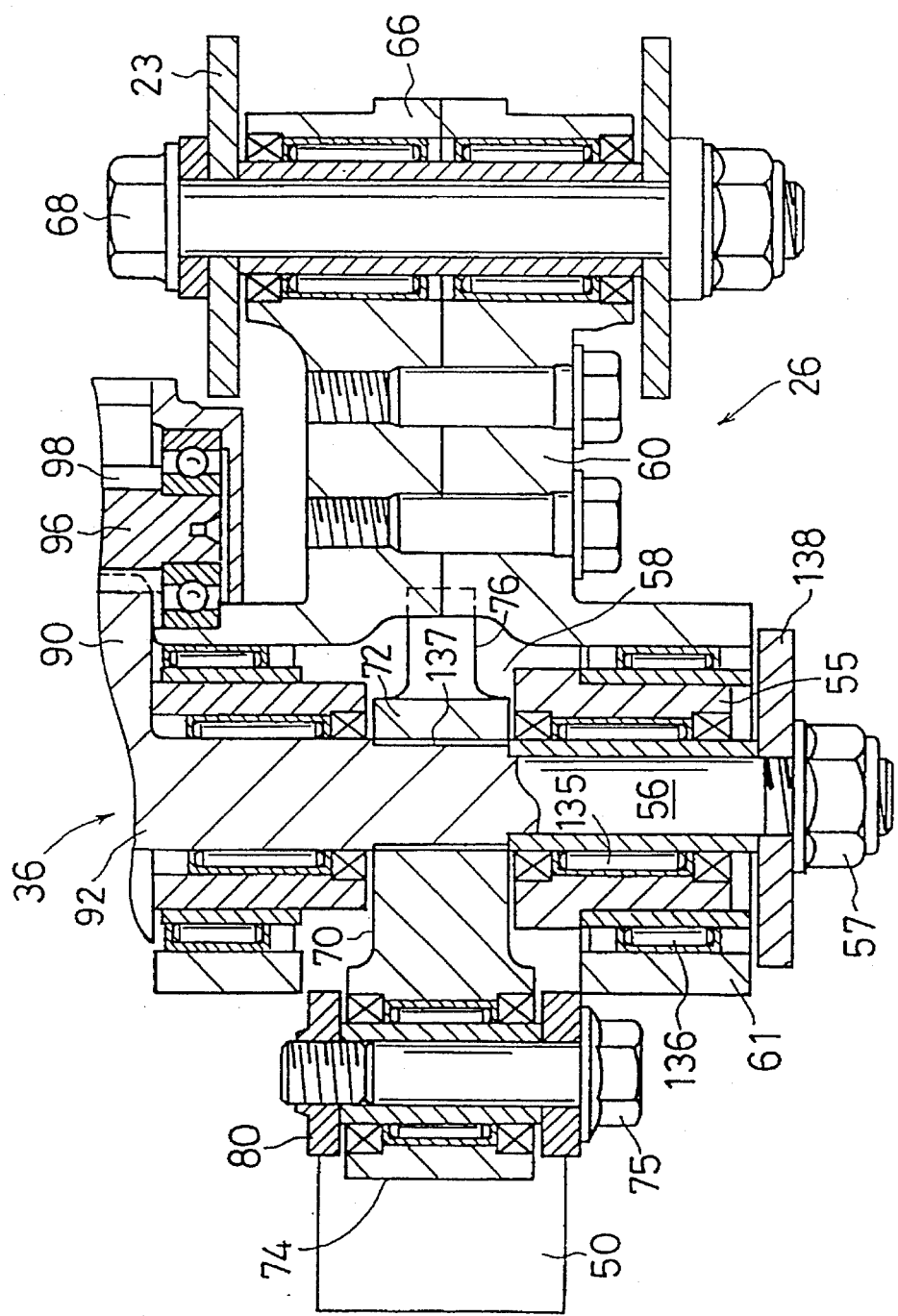
FIG. 10 is a sectional view of the shock absorber link mechanism and the driven portion of a third embodiment.

FIG. 10 is a third embodiment wherein the bearing structure between the arm connecting shaft 56 and the boss 61 of the second link arm 60 is modified. In the first embodiment, the boss 61 of the second link arm 60 is located on the inner side and the boss 55 of the first link arm 50 is located on the outer side of the bearing structure. The third embodiment reverses this relationship. The third embodiment places the boss 61 of the second link arm 60 on the outer side and the boss 55 of the first link arm 50 on in the inner side of the bearing structure which allows the first link arm 50 to be made more compact than the first embodiment.

Figure 14:
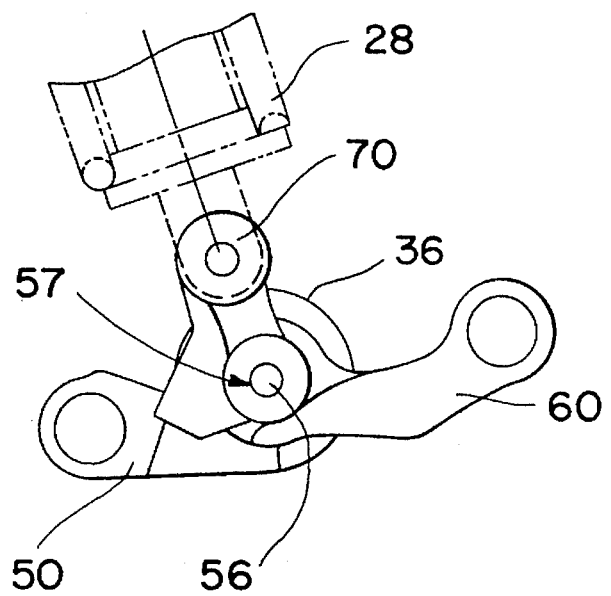
FIG. 14 is a schematic side elevation view, with some parts omitted, showing the arrangement of shock absorber link arm on a different shaft.

It is to be noted that the embodiments of the invention of the present application can be modified in various manners. For example, although the structure is simplified and advantageous where the shock absorber link arm 70 is mounted on the shock absorber link mechanism 26 such that they are connected to each other by the first link arm 50 as well as the second link arm 60 and the arm connecting shaft 56 as in the embodiments it is possible to mount the shock absorber link arm 70 on the shock absorber link mechanism 26 using a shaft 57 different from the arm connecting shaft 56 as shown in FIG. 14 if the shaft 57 is located in the proximity of the arm connecting shaft 56 and the degree of freedom in adjustment of the link ratio can be made high.

Furthermore, the motion transmission member is not limited to the wires 32 and 34 but may also be constructed with chains. However, only if the motion transmission member is flexible can the motion of the shock absorber link mechanism 26 (described above) be prevented from influencing the actuator 30.

Further, the sub-wire 40 for preventing an increase of the height of the motorcycle when the sharing load is decreased is not limited to the embodiments described above, and if it is combined with motorcycle height adjustment means of the type which automatically adjust the height of the motorcycle by varying the link ratio, then adjustment of the height of the motorcycle can be performed so as to be more suitable for actual running.

The structure of the first embodiment wherein the actuator 30 and the driven portion 36 are separate from each other, the structure of the second embodiment wherein the actuator 30 and the driven portion 36 are integrated with each other, and the various modifications described above can be combined, solely or in suitable combination, with any of inventions wherein the link ratio is varied to adjust the height of the motorcycle without varying the link form and inventions wherein the link ratio is varied by variation of the link form to adjust the height of the motorcycle.

A rear wheel suspension apparatus for a motorcycle according to the invention of the present application includes a shock absorber link mechanism and is characterized in that the shock absorber link mechanism includes a first link arm mounted at one end for pivotal motion on the body frame, a second link arm mounted at one end for pivotal motion at the other end of the first link arm is mounted for pivotal motion on the rear swing arm, and a shock absorber link arm mounted at one end for pivotal motion in the proximity of a connection portion between the first link arm and the second link arm and mounted at the other end for pivotal motion on the rear shock absorber. The shock absorber link arm is rockable around a pivotally mounting portion provided in the proximity side of the connection portion between the first link arm and the second link arm. The rear wheel suspension apparatus further comprises a driving means for automatically rocking the shock absorber link arm.

Consequently, when the shock absorber link arm is rocked by the driving means, the link ratio is varied so that the height of the motorcycle can be adjusted. Because height adjustment of the motorcycle is performed automatically in this manner, a driver can operate the height adjustment while remaining on the motorcycle. The present invention eliminates the troublesome manual height adjustment that is performed after the driver gets off the motorcycle (as with the conventional rear wheel shock absorber apparatus for a motorcycle). Accordingly, when it is desired to adjust the height of the motorcycle while driving, the height of the motorcycle can be adjusted using the present invention at any desired time and while the driver remains on the motorcycle.

Moreover, since a motorcycle height adjustment mechanism is formed making use of the shock absorber link mechanism, the driving means can be made comparatively small in size and low in weight. Further, if the actuator and the driven portion of the driving means are separated from each other and are interconnected by the motion transmission member, the non-suspended load can be reduced by disposing the actuator separately on a spring. Using this arrangement the actuator can be prevented from being driven by movement of the shock absorber link mechanism which is moved together with the rear swing arm.

Further, a stopper for contacting with either the first link arm or the second link arm (depending upon a direction of the rocking motion) to limit the rocking motion of the shock absorber link arm within a predetermined range can be provided on the shock absorber link arm. Because either the first link arm or the second link arm and the stopper are contacted with each other (depending upon the direction of the rocking motion) so that the shock absorber link arm is integrated with either the first link arm or the second link arm, the link form of the shock absorber link mechanism can easily be varied. Consequently, if the link form is varied to change over the load characteristic even in a condition wherein the height of the motorcycle is low, an ideal load characteristic can be obtained whether the height of the motorcycle is high or low.

Moreover, if the rear wheel suspension apparatus for a motorcycle which allows variation of the link form is constructed such that a plurality of contacting points with the stopper are provided on either the first link arm or the second link arm, since the rocking motion of the shock absorber link arm can be controlled to a plurality of stages, the link ratio can be varied in the same link form without varying the link form itself.

Further, if the rear wheel suspension apparatus wherein the rocking motion of the shock absorber link arm can be controlled to a plurality of stages is constructed such that at least a driving portion of the driving means on the driven side is supported on one of the first link arm and the second link arm with which the shock absorber link arm is contacted in the link form used normally, then when the link ratio is varied in the same link form, since the driven portion and the shock absorber link arm move integrally, even if the rear swing arm is rocked, no influence is had, and as a result, the driven portion is required to have a small amount of motion. Consequently, reduction in size can be achieved.

Further, since the motion transmission member for the driving force need not have an excessively high strength, this can contribute to reduction in size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension apparatus comprising:

a first link arm for pivotally mounting at one end on a body frame, a second link arm pivotally mounted at one end to said first link arm and for pivotally mounting at the other end to a rear swing arm, and a shock absorber link arm pivotally mounted at one end in the proximity of a connection portion between said first link arm and said second link arm and for pivotally mounting at the other end to a shock absorber such that said shock absorber link arm is rockable around a pivotal mounting portion provided in the proximity of the connection portion between said first link arm and said second link arm, and a driving means for automatically rocking said shock absorber link arm.

2. The suspension apparatus according to claim 1, wherein said driving means includes an actuator, a motion transmission member, and a driven member, wherein said actuator and said driven member are interconnected by said motion transmission member.

3. The suspension apparatus according to claim 1, further comprising:

stoppers provided on said first link arm and said second link arm limiting the rocking motion of said shock absorber link arm within a predetermined range.

4. The suspension apparatus according to claim 3, wherein said stoppers further comprise a plurality of contacting points that are provided on at least one of said first link arm and said second link arm to limit the rocking motion of said shock absorber link arm to a plurality of stages.

5. A suspension apparatus comprising:

a first link arm for pivotally mounting to a frame;

a second link arm for pivotally mounting to a swing arm;

a shock absorber link arm for pivotally mounting to a shock absorber;

an arm connecting shaft pivotally connecting said first link arm and said second link arm and integrally connected to said shock absorber link arm; and an actuator for actuating said shock absorber link arm to change a link ratio of said first link arm and said shock absorber link arm to thereby raise and lower the suspension apparatus.

6. The suspension apparatus of claim 5 wherein said actuator includes a motor unit and wherein said suspension apparatus further comprises a motion transmission member transmitting motion from said motor unit to a driven portion that actuates said shock absorber link arm.

7. The suspension apparatus of claim 6 wherein said driven portion further comprises:

a driven shaft driven by said motion transmission member having a gear at one end and a sectoral toothed gear meshed with the gear of said driven shaft driving said arm connecting shaft to thereby change the link ratio.

8. The suspension apparatus of claim 6 wherein said motor unit further comprises:

a motor, a motor shaft, a speed reduction mechanism reducing the speed imparted to said motor shaft by said motor, and an actuator pulley transferring rotation from said speed reduction mechanism to said motion transmission member.

9. The suspension apparatus of claim 6 wherein said driven portion further comprises:

a driven pulley for transferring motion from said motion transmission member to said arm connecting shaft, and a tension member for connecting with the frame and driven by the pulley for pulling the frame towards said driven pulley and for compressing the shock absorber when the suspension apparatus is in a lowered position and for releasing the compression of the shock absorber when the suspension apparatus is in a raised position.

10. The suspension apparatus of claim 5 further comprising:

an angle sensor sensing the rotation angle of said arm connecting shaft and a controller controlling said actuator in response to the angle sensed by said angle sensor.

11. The suspension apparatus of claim 5 wherein said first link arm and said shock absorber link arm both include respective stop portions limiting the range of motion between said first link arm and said shock absorber link arm.

12. The suspension apparatus of claim 5 wherein said second link arm and said shock absorber link arm both include respective stop portions limiting the range of motion between said second link arm and said shock absorber link arm.

13. The suspension apparatus of claim 5 wherein said first link arm and said shock absorber link arm both include respective first stop portions limiting the range of motion between said first link arm and said shock absorber link arm and further wherein said second link arm and said shock absorber link arm both include respective second stop portions limiting the range of motion between said second link arm and said shock absorber link arm.

14. The suspension apparatus of claim 5 wherein said first link arm and said shock absorber link arm move integrally when the suspension apparatus is in either a first link ratio corresponding to a raised suspension or a second link ratio corresponding to a lowered suspension.

15. The suspension apparatus of claim 5 wherein a link form is varied by said actuator such that said second link arm and said shock absorber link arm move integrally.

16. The suspension apparatus of claim 5 wherein said actuator further comprises:

a motor unit, a driven shaft driven by said motor unit at one end and having a gear at the other end, a sectoral toothed gear meshed with the gear of said driven shaft driving said arm connecting shaft to thereby change the link ratio.

17. The suspension apparatus of claim 16 wherein said motor unit further comprises:

a motor, a motor shaft, and a speed reduction mechanism reducing the speed imparted to said motor shaft by said motor.

18. The suspension apparatus of claim 16 wherein said actuator further comprises:

a driven pulley driven by said motor unit, and a tension member for connecting with the frame and driven by the pulley for pulling the frame towards said driven pulley to compress the shock absorber when the suspension is in a lowered position and to release the compression of the shock absorber when the suspension is in a raised position.

19. The suspension apparatus of claim 16 further comprising:

an angle sensor sensing the rotation angle of said arm connecting shaft; and a controller controlling said actuator in response to the angle sensed by said angle sensor.

20. The suspension apparatus of claim 16 wherein said first link arm and said shock absorber link arm both include respective stop portions limiting the range of motion between said first link arm and said shock absorber link arm.

21. The suspension apparatus of claim 16 wherein said second link arm and said shock absorber link arm both include respective stop portions limiting the range of motion between said second link arm and said shock absorber link arm.

22. The suspension apparatus of claim 16 wherein said first link arm and said shock absorber link arm both include respective first stop portions limiting the range of motion between said first link arm and said shock absorber link arm and further wherein said second link arm and said shock absorber link arm both include respective second stop portions limiting the range of motion between said second link arm and said shock absorber link arm.

23. The suspension apparatus of claim 16 wherein said first link arm and said shock absorber link arm move integrally when the suspension apparatus is in either a first link ratio corresponding to a raised suspension or a second link ratio corresponding to a lowered suspension.

24. The suspension apparatus of claim 16 wherein a link form is varied by said actuator such that said second link arm and said shock absorber link arm move integrally.

25. A suspension apparatus, comprising:

a shock absorber link mechanism having a variable link ratio for linking a shock absorber to a swing arm, and an actuator for actuating said shock absorber link mechanism to vary the link ratio.

26. A suspension apparatus, comprising:

a shock absorber link mechanism having a variable link form for linking a shock absorber to a swing arm, and an actuator actuating said shock absorber link mechanism to vary the link form.

\* \* \* \* \*